US012680355B1

(12) United States Patent
Hanstad

(10) Patent No.: US 12,680,355 B1

(45) Date of Patent: Jul. 14, 2026

(54) HINGE ASSEMBLY WITH RECESSED GASKETS

(71) Applicant: Christopher R Hanstad, Southgate, CA (US)

(72) Inventor: Christopher R Hanstad, Southgate, CA (US)

( * ) Notice: Subject to any disclaimer, the term of this patent is extended or adjusted under 35 U.S.C. 154(b) by 0 days.

(21) Appl. No.: 19/234,774

(22) Filed: Jun. 11, 2025

(51) Int. Cl.
*E05D 5/02* (2006.01)
*E05D 3/02* (2006.01)

(52) U.S. Cl.
CPC ............ *E05D 3/02* (2013.01); *E05Y 2800/12* (2013.01)

(58) Field of Classification Search
CPC ... E05D 5/0246; E05D 5/0253; E05D 5/0261; E05D 5/0269; E05D 2005/0263; E05D 2005/0261; E05D 2005/0269; E05D 7/081; E05D 7/08; E05D 2003/027; E05D 3/02; E05Y 2900/114; E05Y 2600/502; E05Y 2600/60; E05Y 2800/12; E05F 1/1215; E05F 1/12; E05F 1/1207; E05F 3/20; E05F 3/18; E05F 11/385; E06B 3/54; A47K 3/362; A47K 2003/367; A47F 3/12; A47F 3/125
See application file for complete search history.

(56) References Cited

U.S. PATENT DOCUMENTS 5,867,869 A * 2/1999 Garrett .................... E05D 15/54 16/334
6,161,255 A * 12/2000 Garrett ................ E05D 11/1064 16/382
7,493,673 B2 * 2/2009 Garrett ...................... E06B 3/54 16/382
8,966,713 B1 * 3/2015 Russo ....................... E05D 7/00 16/285
9,879,456 B1 * 1/2018 Chen ....................... E05D 11/10
2002/0116787 A1 * 8/2002 Miller ................. E05D 11/1064 16/252
2006/0032018 A1 * 2/2006 Garrett .................... E05D 5/128 16/252
2006/0207060 A1 * 9/2006 Cheng .................. E05D 5/0246 16/252
2006/0284522 A1 * 12/2006 Burke .................. E06B 3/5454 312/116

(Continued)

FOREIGN PATENT DOCUMENTS

AU 2022200698 A1 * 8/2022 ........... E05D 5/0246
CN 210918622 U * 7/2020

(Continued)

*Primary Examiner* — Chuck Y Mah
(74) *Attorney, Agent, or Firm* — Cohen IP Law Group P.C.; Michael N. Cohen

(57) ABSTRACT

A hinge assembly with recessed gaskets. The hinge assembly includes two base plates and two corresponding cover plates. Each base plate includes a recess specifically designed to hold a corresponding base plate gasket in the proper position and orientation for installation and use of the hinge assembly. Similarly, each cover plate includes a recess specifically designed to hold a corresponding cover plate gasket in the proper position and orientation for installation and use of the hinge assembly. The recesses and associated gaskets are specifically dimensioned to ensure that the gaskets are not exposed beyond the periphery of the hinge assembly once installed.

17 Claims, 10 Drawing Sheets

(56) References Cited

U.S. PATENT DOCUMENTS

| | | | | |
|---|---|---|---|---|
| 2009/0106937 | A1* | 4/2009 | Bai | E05D 11/105<br>16/252 |
| 2018/0298658 | A1* | 10/2018 | Brun | E05D 7/0415 |
| 2019/0211602 | A1* | 7/2019 | Stuart | E05D 5/0246 |

FOREIGN PATENT DOCUMENTS

| | | | | | |
|---|---|---|---|---|---|
| CN | 212958158 | U | * | 4/2021 | |
| CN | 214035206 | U | * | 8/2021 | |
| CN | 220929056 | U | * | 5/2024 | |
| DE | 202005009826 | U1 | * | 10/2005 | E04F 11/1851 |
| DE | 202008001656 | U1 | * | 4/2008 | E05D 5/0246 |
| EP | 1193360 | A2 | * | 4/2002 | E05D 5/0246 |

* cited by examiner

HINGE ASSEMBLY WITH RECESSED GASKETS

FIELD OF THE INVENTION

This invention relates to hinges, including a glass door hinge with recessed gaskets.

BACKGROUND

Hinge assemblies designed for use with glass doors (e.g., glass shower doors) are used throughout the world.

During installation of the hinge assemblies with the glass panels, gaskets are oftentimes used between the plates of the hinge assembly and the surfaces of the glass panels to lock the plates in place while providing a waterproof seal.

However, such gaskets oftentimes slip and/or move out of alignment during installation of the hinge assemblies thereby causing installation difficulties as well as potential safety hazards.

Accordingly, there is a need for a hinge assembly for use with glass doors that includes recessed gaskets.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, the hinge assembly according to exemplary embodiments hereof includes a hinge assembly for use with glass doors (e.g., glass shower doors) wherein the hinge assembly includes recessed gaskets. As describe herein, the recesses hold the gaskets in the proper position and orientation during installation and usage of the hinge assembly.

Figure 1:
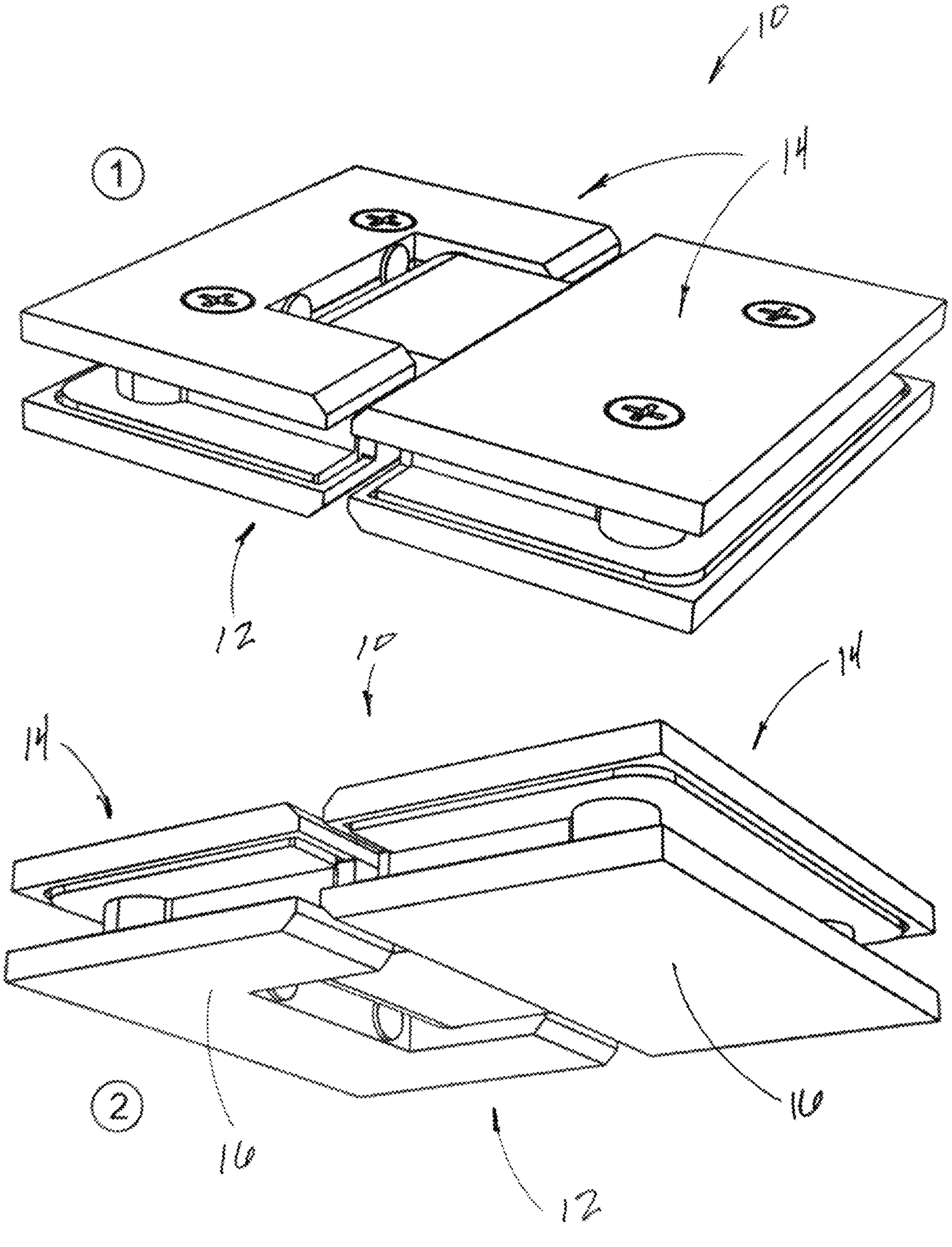
FIG. 1 shows perspective views of a hinge assembly according to exemplary embodiments hereof.

FIG. 1, image (1) shows a perspective view of the hinge assembly 10 from above and FIG. 1, image (2) shows a perspective view of the hinge assembly 10 from below.

Figure 2:
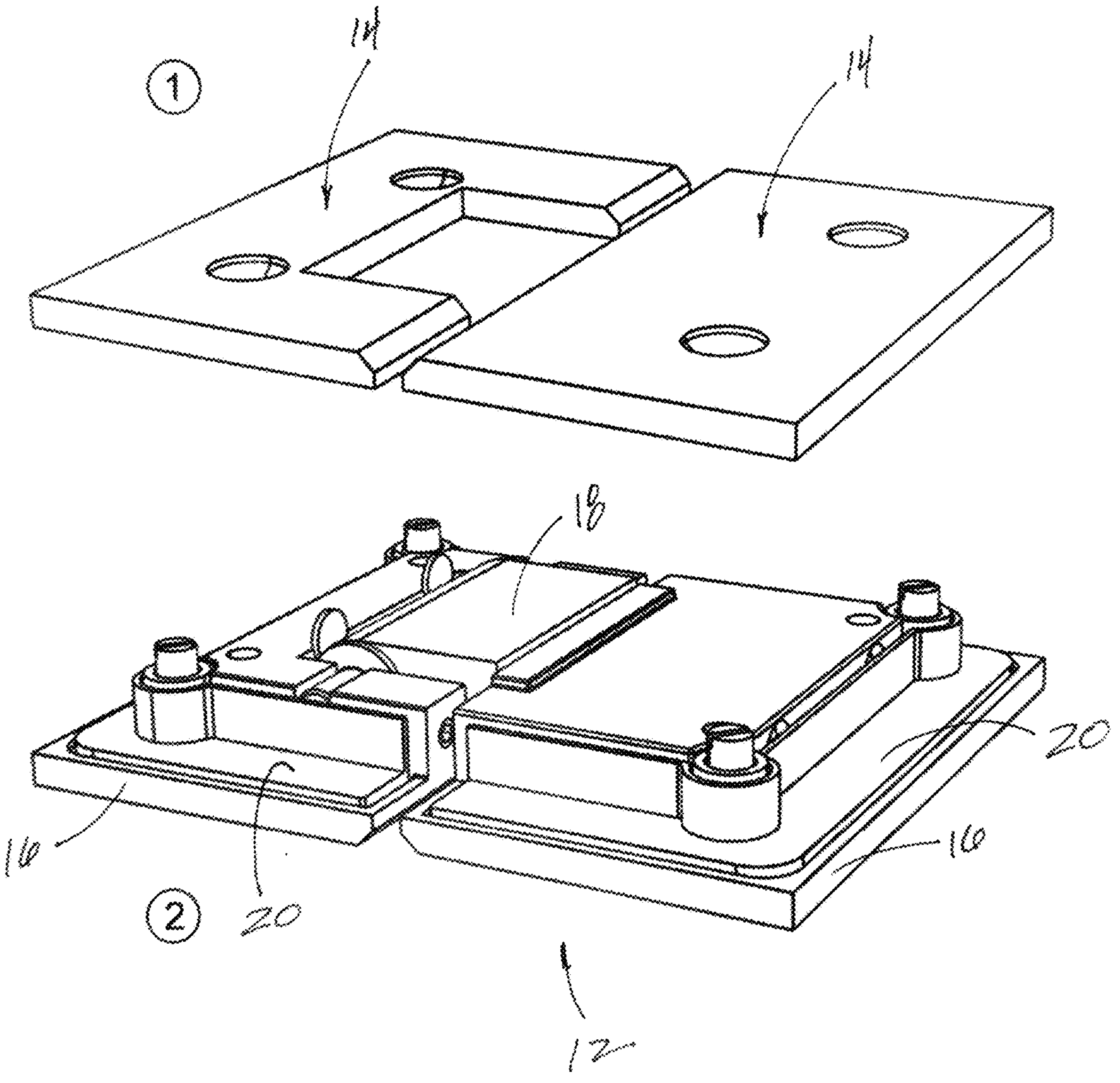
FIG. 2 shows a cover plate separate from a hinge body according to exemplary embodiments hereof.
Figure 3:
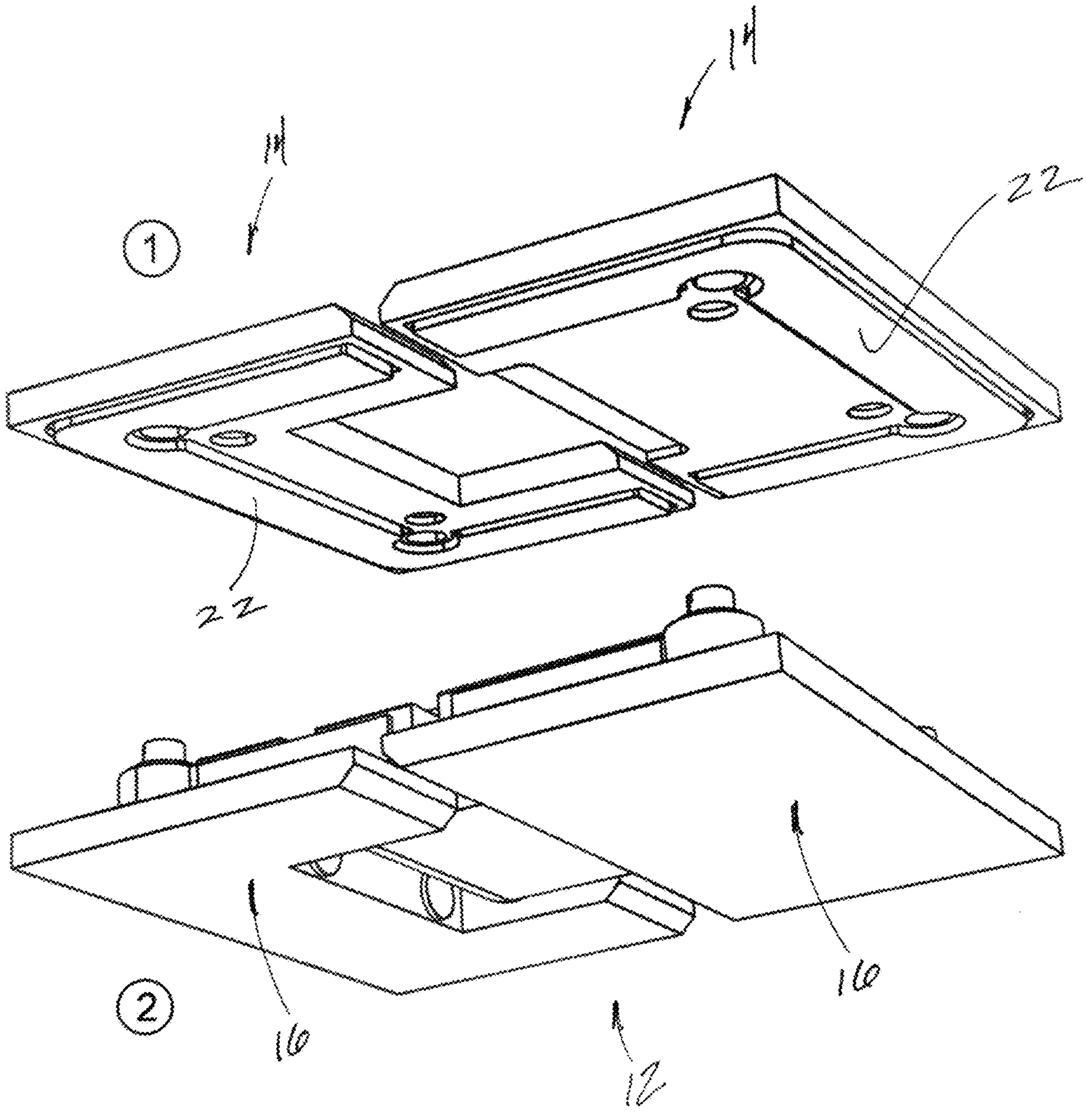
FIG. 3 shows a cover plate separate from a hinge body according to exemplary embodiments hereof.

In some embodiments, as shown in FIGS. 1, 2 and 3, the hinge assembly 10 (also referred to herein as simply the assembly 10) includes a hinge body 12 and one or more hinge cover plate(s) 14. FIG. 2 shows the hinge assembly 10 of FIG. 1, image (1), with the hinge cover plate 14 separated from the hinge body 12, and FIG. 3 shows the hinge assembly 10 of FIG. 1, image (2), with the hinge cover plate 14 separated from the hinge body 12.

In general, the hinge body 12 includes a first base plate 16 hingedly coupled to a second base plate 16 via a hinge mechanism 18. The first and second base plates 16 also may include other various functional elements of the hinge assembly 10, e.g., hinge mechanism, springs, pins, etc., configured therewith, e.g., on the exposed sides of the base plates 16 as shown in FIG. 2. The hinge cover plates 14 may include a first cover plate 14 designed to be attached to and to cover an exposed side of the first base plate 16 (e.g., to the left in FIGS. 1, 2, 3) and at least some of the functional elements configured therewith, and a second cover plate 14 designed to be attached to and to cover an exposed side of the second base plate 16 (e.g., to the right in FIGS. 1, 2, 3) and at least some of the functional elements configured therewith.

During use, the first base plate 16 and its respective first cover plate 14 may be configured with a first panel (e.g., a first sheet of glass) and the second base plate 16 and its respective cover plate 14 may be configured with a second panel (e.g., a second sheet of glass). In this way, the first and second panels may be controllably rotated with respect to one another about the hinge assembly 10.

During installation, the first cover plate 14 may be removed from the first base plate 16 (see FIG. 2) so that the first cover plate 14 and the first base plate 16 may be secured to the first panel. The first base plate 16 and the first cover plate 14 may be placed on opposites sides of the first panel (e.g., at an edge of the first panel) and then remated to secure the first base plate 16 first cover plate 14 combination thereto. Similarly, the second cover plate 14 may be removed from the second base plate 16 (see FIG. 2) so that the second cover plate 14 and the second base plate 16 may be secured to the second panel. The second base plate 16 and the second cover plate 14 may be placed on opposites sides of the second panel (e.g., at an edge of the second panel) and then remated to secure the second base plate 16 second cover plate 14 combination thereto. In this way, with the first base plate 16 and its cover plate 14 attached to an edge of the first panel, and the second base plate 16 and its cover plate 14 attached to an edge of the second panel, the first and second panels may be hingedly coupled to one another.

In some embodiments, as shown in FIG. 2, each base plate 16 includes one or more integrated base gaskets 20, and as shown in FIG. 3, each hinge cover plate 14 includes one or more integrated plate gaskets 22.

In some embodiments, each base plate 16 includes a base plate gasket recess 24 formed to receive and secure a corresponding integrated base plate gasket 20, and each cover plate 14 includes a cover plate gasket recess 26 formed to receive and secure a corresponding integrated cover plate gasket 22.

Figure 4:
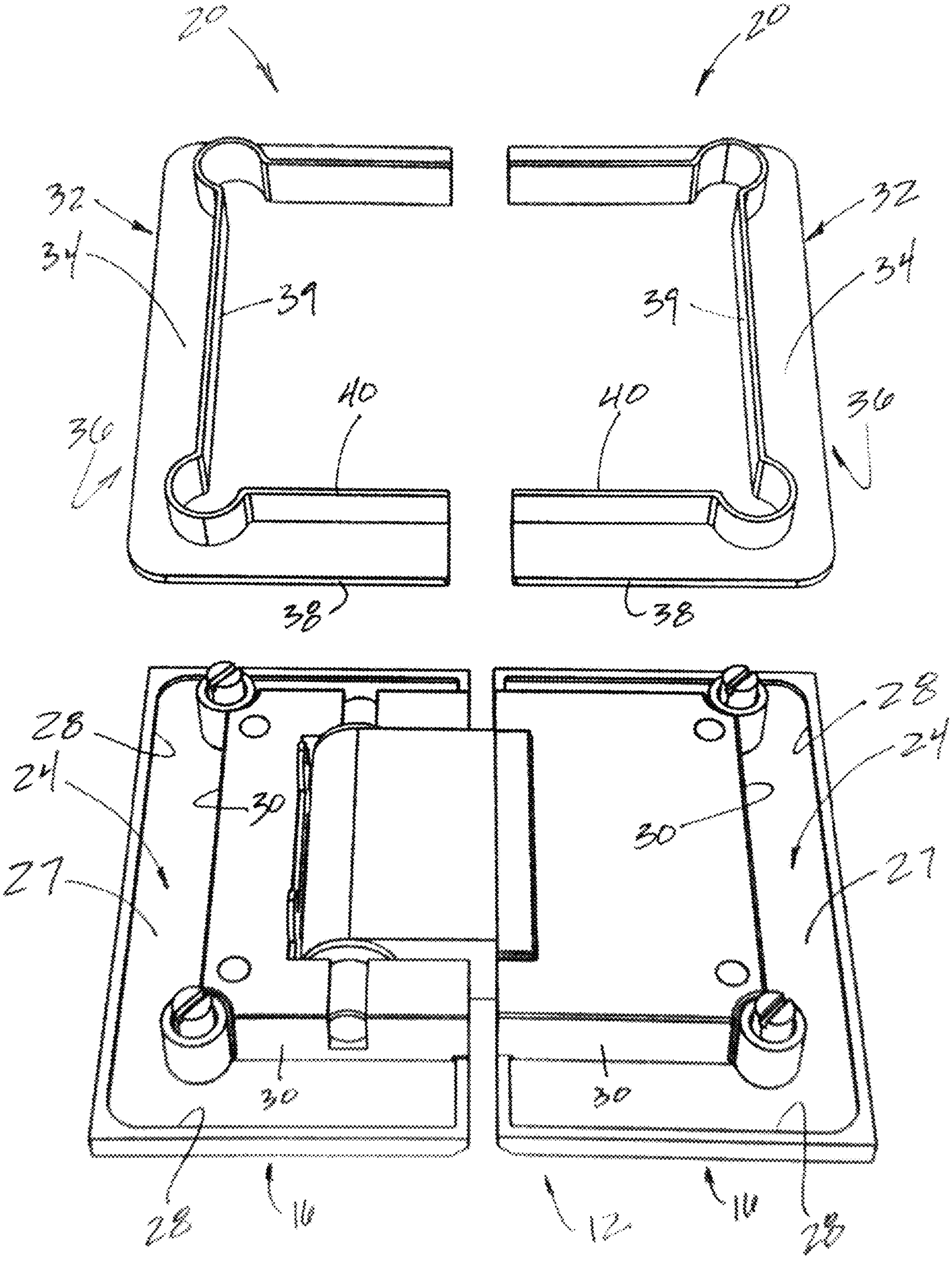
FIG. 4 shows a base plate and an associated base plate gasket according to exemplary embodiments hereof.
Figure 5:
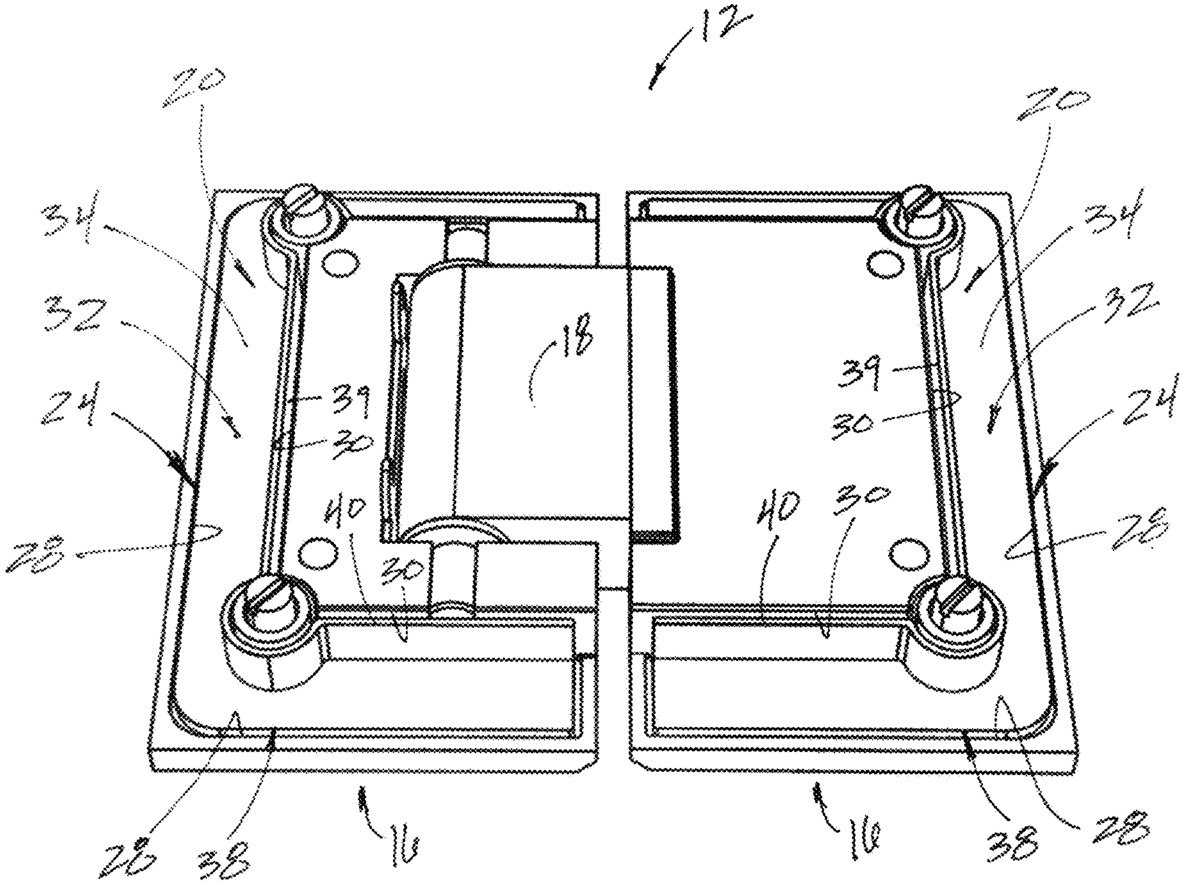
FIG. 5 shows aspects of a base plate and a base plate gasket according to exemplary embodiments hereof.

FIG. 4 shows the integrated base plate gaskets 20 separate from the corresponding base plates 16, and FIG. 5 shows the integrated base plate gaskets 20 received into the corresponding base plate's gasket recess 24.

In some embodiments, as shown in FIG. 4, each base plate gasket recess 24 is defined by a recess bottom 27, an outer periphery recess sidewall 28, and an inner periphery recess sidewall 30. In addition, in some embodiments, each base plate gasket 20 includes a gasket base member 32 defined by a gasket base upper surface 34, a gasket base underneath surface 36 (e.g., generally opposite the gasket base upper surface 34), gasket base outer periphery sidewalls 38 and gasket base inner periphery sidewalls 39, with the outer and inner periphery sidewalls 38, 39 extending about the outer and inner periphery of the base gasket 20, respectively, and extending between the gasket base upper surface 34 and the gasket base underneath surface 36.

In some embodiments, the footprint of the gasket base member 32 as defined by the gasket underneath surface 36 and the gasket sidewalls 38, 39 matches the footprint of the base plate gasket recess 24 defined by the gasket recess bottom 27 and the gasket outer and inner periphery recess sidewalls 28, 30. In this way, when the base plate gasket 20 is received into the base plate gasket recess 24, the base plate gasket's base member 32 fits snug within the base plate gasket recess 24. This is shown in FIG. 5. This arrangement holds the base plate gasket 20 in the proper position and orientation during installation and use of the hinge assembly 10, thereby improving the ease and accuracy of the installation and of the overall functionality of the hinge assembly 10. That is, slipping and/or other types of movement (e.g., lateral movements) of the base plate gasket 20 during installation may be prevented by the base plate gasket recess 24.

Note that a very small gap may exist between the gasket base member 32 sidewalls 38 and the gasket recess 24 outer and inner periphery sidewalls 28, 30 to provide for manufacturing tolerances. In some embodiments, this gap may preferably be less than about 1 mm, however, it is understood that the gap may be larger as long as the base plate gasket 20 may be received and held within the gasket recess 24 during and after installation of the hinge assembly 10.

In some embodiments, the base plate gasket 20 may be secured within the base plate gasket recess 24 using adhesive, double-sided tape, and/or by other attachment techniques. For example, adhesive and/or double-sided tape may be placed between the gasket's underneath surface 36 and the bottom 27 of the gasket recess 24 prior to placing the gasket 20 into the recess 24 for use. In other embodiments, the base plate gasket 20 may be held within the base plate gasket recess 24 by pressure fit between the edges of the gasket 20 and the sidewalls of the gasket recess 24.

In some embodiments, as shown in FIGS. 4 and 5, the base plate gasket 20 may include extended sidewalls 40 that extend upward from the gasket's upper surface 34, e.g., about its inner periphery. Such extended sidewalls 40 may extend between the base plate gasket 20 and the cover plate gasket 22 when the cover plate 14 is secured to the base plate 16. In some embodiments, the extended sidewalls 40 may include corner radiuses to accommodate securing elements (e.g., pins or bolts) of the hinge assembly 10. In any event, when the base plate gasket 20 is received into the base plate gasket recess 24, the extended sidewalls 40 may preferably abut against the recess's inner periphery sidewalls 30 to facilitate the retention of the gasket 20 within the recess 24. This is shown in FIG. 5.

Figure 10:
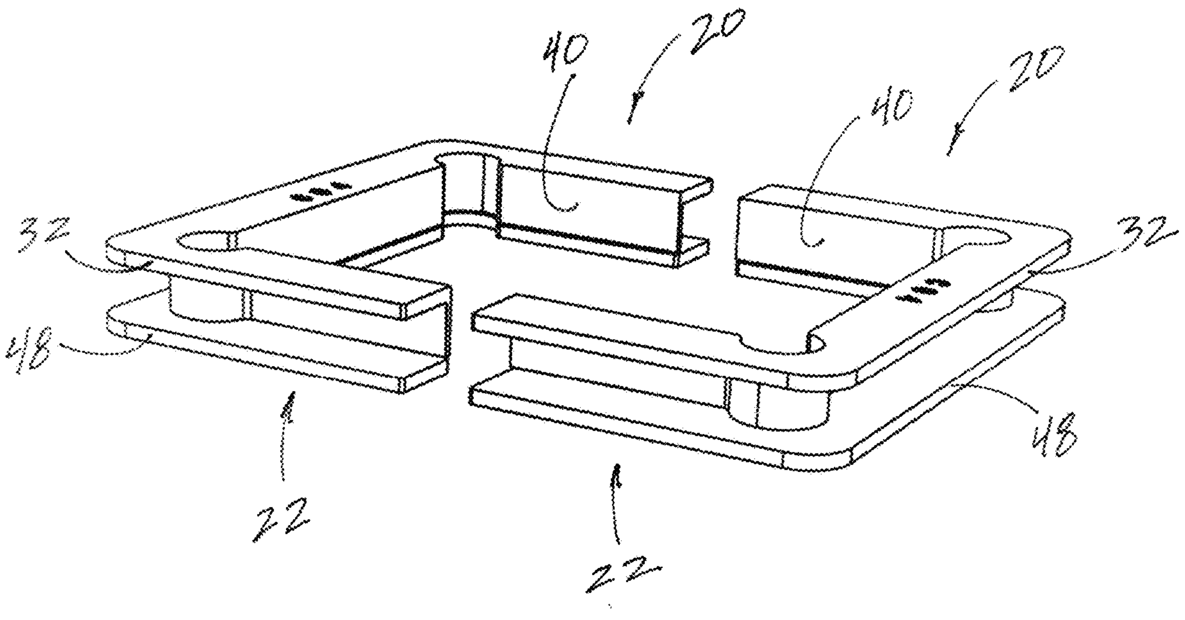
FIG. 10 shows a base plate gasket and a cover plate gasket according to exemplary embodiments hereof.

In some embodiments, the extended sidewalls 40, and/or portions thereof, may be configured with the cover plate gasket 22 in addition to or instead of having the extended sidewalls 40 configured with the base plate gasket 20. In any event, the existence of the extended sidewalls 40, either configured with the base plate gasket 20 and/or with the cover plate gasket 22 may extend between the two gaskets 20, 22 during installation and use of the hinge assembly 10. This arrangement of the base plate gasket 20 and the cover plate gasket 22 is shown in FIG. 10 for reference. Note that the extended sidewalls 40 preferably extend entirely from the base member 32 of the base plate gasket 20 to the base member 48 of the cover plate gasket 22 thereby providing a protective gasket wall generally encircling the inner elements of the hinge assembly 10.

Figure 6:
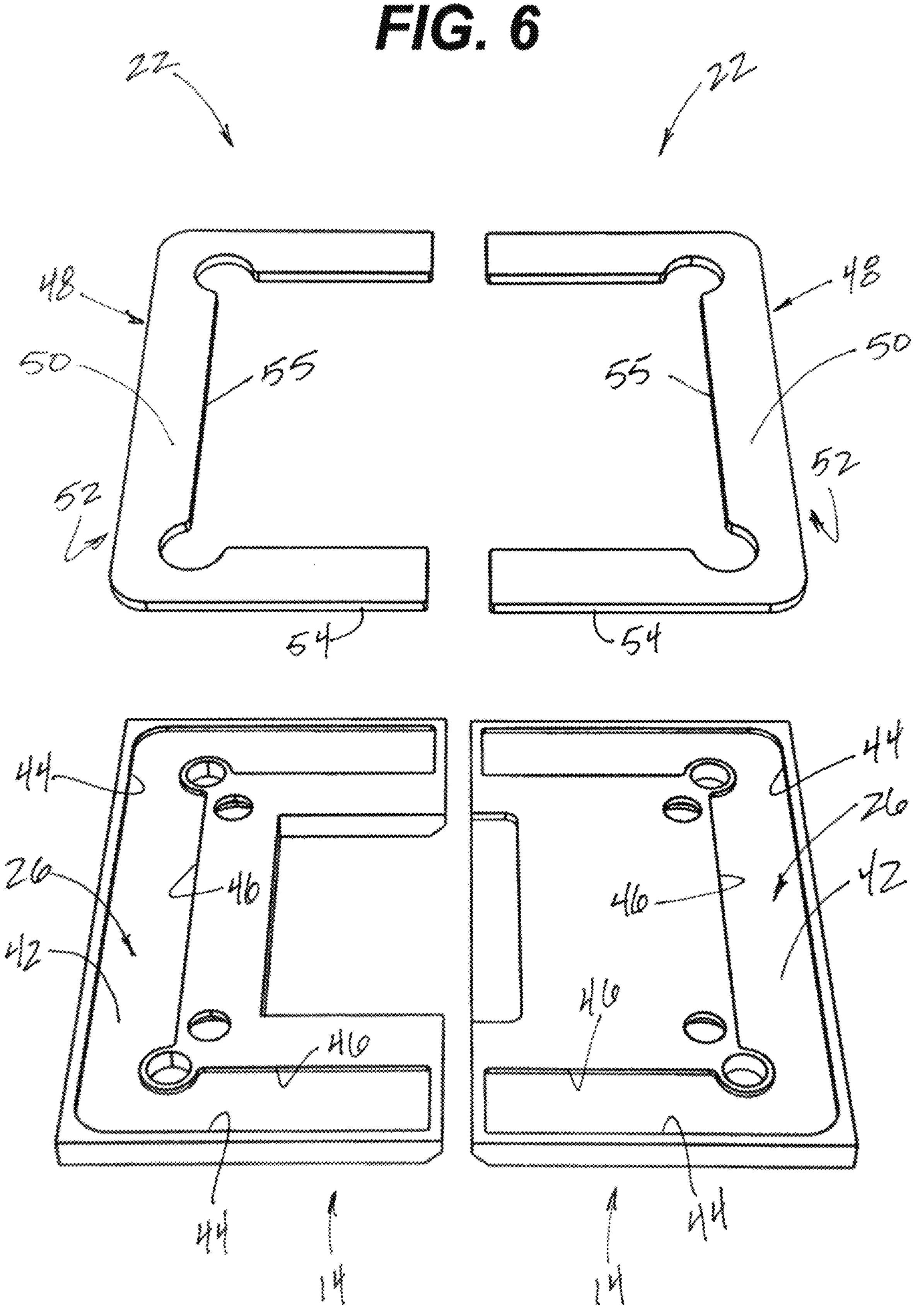
FIG. 6 shows a cover plate and an associated cover plate gasket according to exemplary embodiments hereof.
Figure 7:
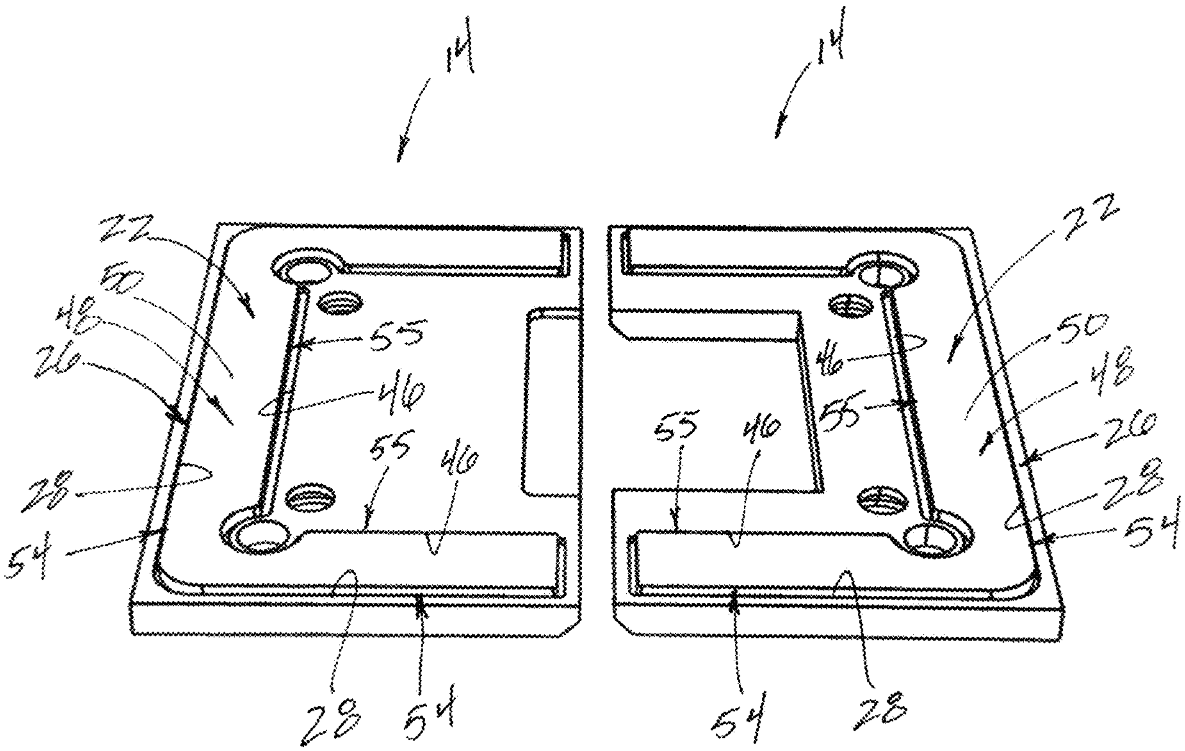
FIG. 7 shows aspects of a cover plate and a cover plate gasket according to exemplary embodiments hereof.

FIG. 6 shows the integrated cover plate gaskets 22 separate from the corresponding cover plates 14, and FIG. 7 shows the integrated cover plate gaskets 22 received into the corresponding cover plate's gasket recess 26.

In some embodiments, as shown in FIG. 6, each cover plate gasket recess 26 is defined by a recess bottom 42, an outer periphery recess sidewall 44, and an inner periphery recess sidewall 46. In addition, in some embodiments, each cover plate gasket 22 includes a gasket base member 48 defined by a gasket base upper surface 50, a gasket base underneath surface 52 (e.g., generally opposite the gasket base upper surface 50), gasket base outer periphery sidewalls 54 and gasket base inner periphery sidewalls 55 extending about the outer and inner periphery of the cover plate gasket 22, respectively, and extending between the gasket base upper surface 50 and the gasket base underneath surface 52.

In some embodiments, the footprint of the gasket base member 48 as defined by the gasket underneath surface 52 and the gasket sidewalls 54, 55 matches the footprint of the cover plate gasket recess 26 defined by the gasket recess bottom 42 and the gasket outer and inner periphery recess sidewalls 44, 46. In this way, when the cover plate gasket 22 is received into the cover plate gasket recess 26, the cover plate gasket's base member 48 fits snug within the cover plate gasket recess 26. This is shown in FIG. 7. This arrangement holds the cover plate gasket 22 in the proper position and orientation during installation and use of the hinge assembly 10, thereby improving the ease and accuracy of the installation and of the overall functionality of the hinge assembly 10. That is, slipping and/or other types of movement (e.g., lateral movements) of the cover plate gasket 22 during installation may be prevented by the cover plate gasket recess 26.

Note that a very small gap may exist between the gasket base member 48 sidewalls 54 and the gasket recess 26 outer and inner periphery sidewalls 44, 46 to provide for manufacturing tolerances. In some embodiments, this gap may preferably be less than about 1 mm, however, it is understood that the gap may be larger as long as the cover plate gasket 22 may be received and held within the gasket recess 26 during and after installation of the hinge assembly 10.

In some embodiments, the cover plate gasket 22 may be secured within the cover plate gasket recess 26 using adhesive, double-sided tape, and/or by other attachment techniques. For example, adhesive and/or double-sided tape may be placed between the gasket's underneath surface 52 and the bottom 42 of the gasket recess 26 prior to placing the gasket 22 into the recess 26 for use. In other embodiments, the cover plate gasket 22 may be held within the cover plate gasket recess 26 by pressure fit between the edges of the gasket 22 and the sidewalls of the gasket recess 26.

Figure 8:
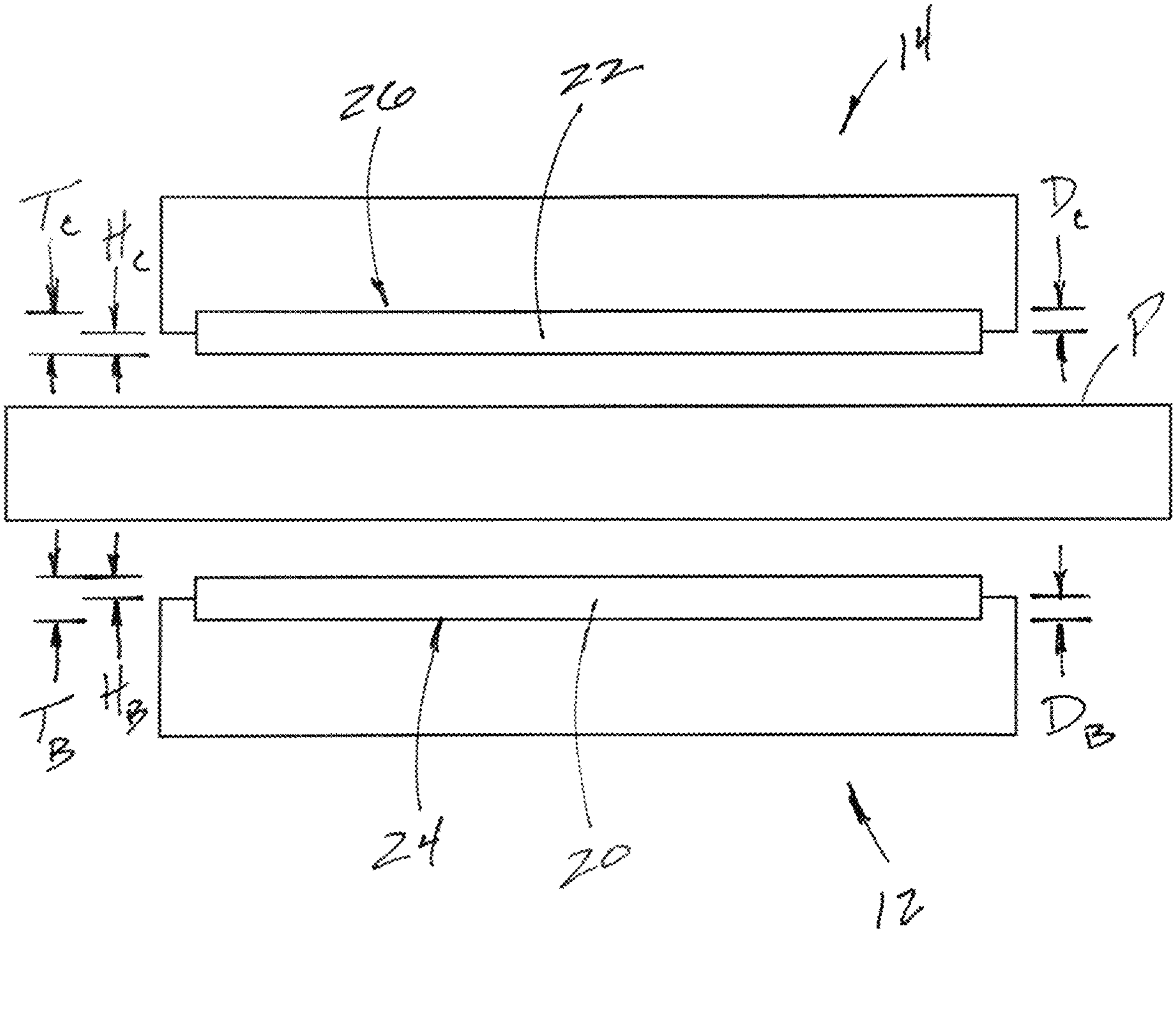
FIG. 8 shows aspects of a hinge assembly with a panel according to exemplary embodiments hereof.

FIG. 8 shows a block diagram sectional side view of the hinge base plate 16 arranged on a first side of a panel and the cover plate 14 arranged on an opposite side of a panel P. This may represent an initial placement of the plates 16, 14 during installation of the plates 16, 14 onto the panel P. As shown, the base plate 16 includes its associated base plate gasket 20 received within its associated base plate gasket recess 24, and the cover plate 14 includes its associated cover plate gasket 22 received within its associated cover plate gasket recess 26.

FIG. 8 shows the depth $D_B$ of the base plate's recess 24, the thickness $T_B$ of the base plate's gasket 20, and the height $H_B$ of the portion of the base plate gasket 20 that extends beyond the top of the base plate recess 24. FIG. 8 also shows the depth $D_C$ of the cover plate's recess 26, the thickness $T_C$ of the cover plate's gasket 22, and the height $H_C$ of the portion of the cover plate gasket 22 that extends beyond the top of the cover plate recess 26.

In some embodiments, the thickness $T_B$ of the base plate's gasket 20 is about 0.5 mm to about 2 mm, and preferably about 1.5 mm, the depth $D_B$ of the base plate's recess 24 is about 0.5 mm to about 2 mm, and preferably about 1 mm, the thickness $T_C$ of the cover plate's gasket 22 is about 0.5 mm to about 2 mm, and preferably about 1.5 mm, and the depth $D_C$ of the cover plate's recess 26 is about 0.5 mm to about 2 mm, and preferably about 1 mm.

In some embodiments, if the base plate's gasket 20 and/or the cover plate's gasket 22 is bonded to the bottom of the respective recess 24, 26 using a bonding tape, the bonding tape may add about 0.1 mm to about 1.5 mm and preferably about 0.6 mm of thickness such that the overall thickness of the gasket 20, 22 and bonding tape combination is about 2.1 mm. Similarly, the thickness $T_C$ of the cover plate's gasket 22 plus the thickness of the bonding tape also may be about 2.1 mm.

Figure 9:
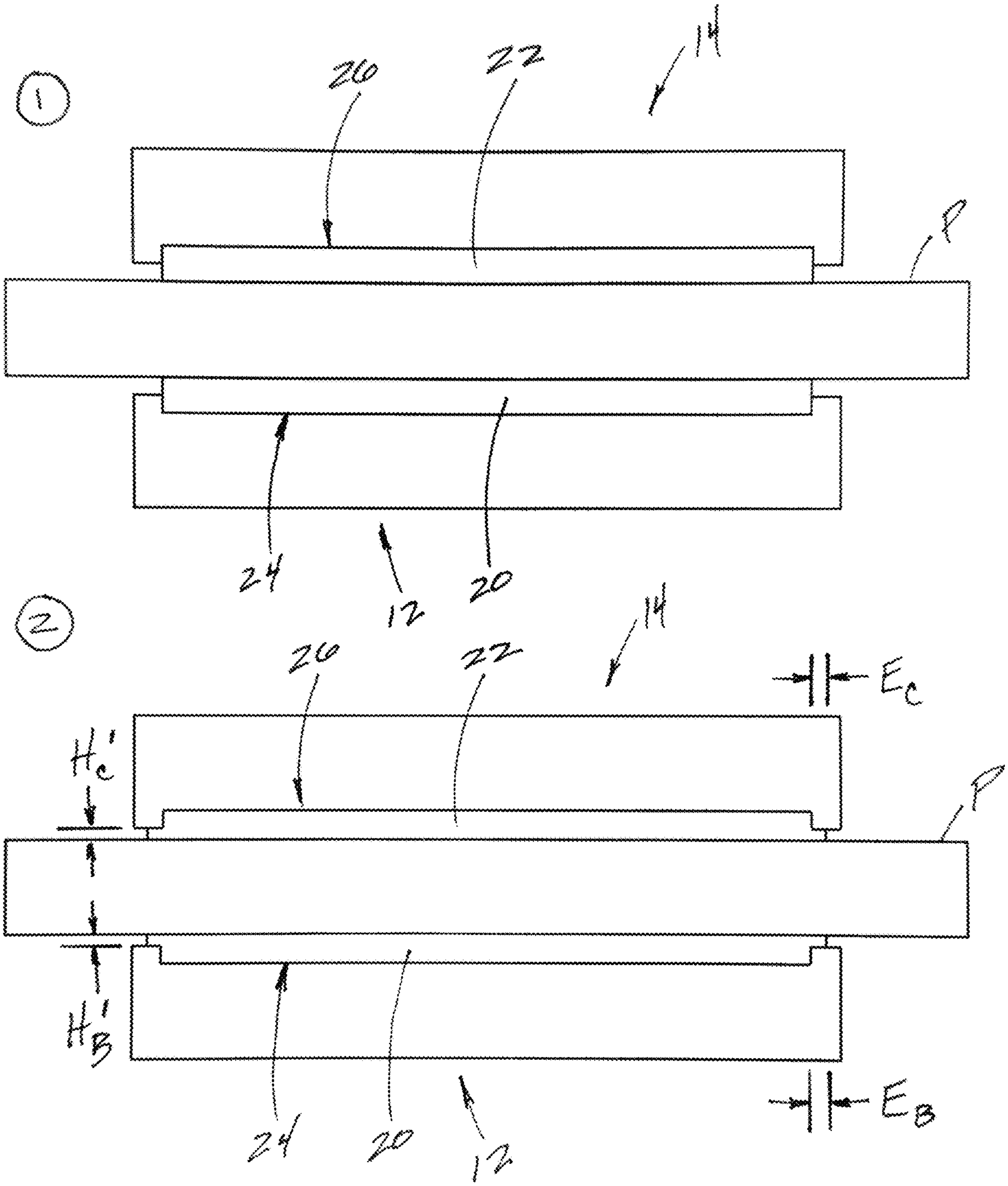
FIG. 9 shows aspects of a hinge assembly with a panel according to exemplary embodiments hereof.

FIG. 9, image (1) shows the base plate 16 positioned to bring its base plate gasket 20 into initial contact with the lower surface of the panel P (without tightening) and the cover plate 14 positioned to bring its cover plate gasket 22 into initial contact with the upper surface of the panel P (without tightening).

FIG. 9, image (2) shows the base plate 16 and the cover plate 14 tightened with respect to one another (e.g., via bolts or screws passing through the base plate 16, the cover plate 14 and the panel P) representing a final stage of the hinge assembly 10 installation to the panel P. It is understood that this simplified depiction is shown as demonstration and that a second base plate 16 and a second cover plate 14 may be similarly arranged on a second panel thereby configuring the first and second panels in a hinged arrangement with one another.

As shown in FIG. 9, image (2), when the base plate 16 and the cover plate 14 are tightened towards one another on either side of the panel P, the height $H_B$ of the portion of the base plate gasket 20 that extends beyond the top of the base plate recess 24 compresses to a height $H_B'$, and the height $H_C$ of the portion of the cover plate gasket 22 that extends beyond the top of the cover plate recess 26 compressed to a height $H_C'$. In addition, and as shown, due to this compression, the base plate gasket 20 may expand outward beyond the outer peripheral sidewall of the recess 24 an amount $E_B$, and the cover plate gasket 22 may expand outward beyond the outer peripheral sidewall of the recess 26 an amount $E_C$.

In some embodiments, the depths $D_B$, $D_C$ of the recesses 24, 26, respectively, the thicknesses $T_B$, $T_C$ of the gaskets 20, 22, respectively, the distances between the outer peripheral sidewalls 28, 44 of the recesses 24, 26 and the outer peripheries of the plates 16, 14, respectively, and the characteristics of the material(s) used to form the gaskets 20, 22 (e.g., the durometer of the gasket material(s)) are chosen such that the amounts $E_B$, $E_C$ that the gaskets 20, 22 extend outward, respectively, when compressed, do not extend beyond the outer peripheries of the base plate 16 and cover plate 14. In some embodiments, it may be preferable that the gaskets 20, 22 when compressed extend only partially and not completely to the outer peripheries of the base plate 16 and cover plate 14. In this way, there may be a space or gap between the outer edge of the compressed gaskets 20, 22 and the outer peripheries of the plates 16, 14. This is critical such that the edges of the gaskets 20, 22 are not exposed beyond the peripheral edges of the plates 16, 14. This keeps the gasket 20, 22 away from direct exposure to the outside elements which may cause the gaskets 20, 22 to degrade, and provides an aesthetically pleasing finished edge to the overall hinge assembly 10. In some embodiments, the base plate gasket 20 and/or of the cover plate gasket 22 has a Shore A harness of about 60 to about 80, and preferably of about 70.

In some embodiments, the distance between the peripheral sidewalls 28 of the base plate recess 24 and the outer edge of the base plate 16 is about 1 mm to about 5 mm, and preferably about 2 mm. Similarly, the distance between the peripheral sidewalls 44 of the cover plate's recess 26 is about 1 mm to about 5 mm, and preferably about 2 mm. Given this, the distance that the outer edges of the compressed gaskets 20, 22 (described above) extend towards the outer edge of the base plate 16 and/or the outer edge of the cover plate 14, respectively, is less than about 2 mm, and preferably less than about 1.5 mm, and more preferably less than about 1 mm. In some embodiments, the thickness of the base plate 16 and of the cover plate 14 is about 4 mm to about 8 mm, and preferably about 5 mm.

It is understood that any aspect and/or element of any embodiment of the assembly 10 described herein or otherwise may be combined in any way with any other aspect and/or element of any other embodiment of the assembly 10 to form additional embodiments of the assembly 10 all of which are within the scope of the assembly 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent, or similar purpose can replace features disclosed in the specification, unless stated otherwise. Thus, unless stated otherwise, each feature disclosed represents one example of a generic series of equivalent or similar features.

The present invention also covers the exact terms, features, values, and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A hinge subassembly comprising:

a first base plate including a first base plate gasket recess;

a first cover plate including a first cover plate gasket recess;

a first base plate gasket including a first base plate gasket first surface adapted to fit within the first base plate gasket recess, and a first base plate gasket second surface opposite the first base plate gasket first surface; and a first cover plate gasket including a first cover plate gasket first surface adapted to fit within the first cover plate gasket recess, and a first cover plate gasket second surface opposite the first cover plate gasket surface;

wherein the first base plate gasket includes at least one first peripheral sidewall extending continuously from the first base plate gasket first surface to the first base plate gasket second surface and to a position beyond the first base plate gasket second surface and/or the first cover plate gasket includes at least one second peripheral sidewall extending continuously from the first cover plate gasket first surface to the first cover plate gasket second surface and to a position beyond the first cover plate gasket second surface.

2. The hinge subassembly of claim 1 wherein the first base plate gasket first surface is adapted to fit entirely within the first base plate gasket recess.

3. The hinge subassembly of claim 1 wherein the first cover plate gasket first underneath surface is adapted to fit entirely within the first cover plate gasket recess.

4. The hinge subassembly of claim 1 wherein the first base plate gasket includes a first base plate gasket footprint, and the first base plate gasket recess includes a first base plate gasket recess footprint that substantially matches the first base plate gasket footprint.

5. The hinge subassembly of claim 1 wherein the first cover plate gasket includes a first cover plate gasket footprint, and the first cover plate gasket recess includes a first cover plate gasket recess footprint that substantially matches the first cover plate gasket footprint.

6. The hinge subassembly of claim 1 wherein the first base plate gasket is secured within the first base plate gasket recess using adhesive and/or pressure fit.

7. The hinge subassembly of claim 1 wherein the first cover plate gasket is secured within the first cover plate gasket recess using adhesive and/or pressure fit.

8. The hinge subassembly of claim 1 further comprising:

a second base plate including a second base plate gasket recess;

a second cover plate including a second cover plate gasket recess;

a second base plate gasket adapted to fit within the second base plate gasket recess; and a second cover plate gasket adapted to fit within the second cover plate gasket recess;

wherein the first base plate is hingedly attached to the second base plate.

9. The hinge subassembly of claim 8 wherein the second base plate gasket includes a second base plate gasket first surface adapted to fit entirely within the second base plate gasket recess.

10. The hinge subassembly of claim 9 wherein the second base plate gasket includes at least one third peripheral sidewall extending continuously from the second base plate gasket first surface to a second base plate gasket second surface opposite the second base plate gasket first surface and to a position beyond the second base plate gasket second surface.

11. The hinge subassembly of claim 8 wherein the second cover plate gasket includes a second cover plate gasket first surface adapted to fit entirely within the second cover plate gasket recess.

12. The hinge subassembly of claim 11 wherein the second cover plate gasket includes at least one fourth peripheral sidewall extending continuously from the second cover plate gasket first surface to a second cover plate gasket second surface opposite the second cover plate gasket first surface and to a position beyond the second cover plate gasket second surface.

13. The hinge subassembly of claim 8 wherein the second base plate gasket includes a second base plate gasket footprint, and the second base plate gasket recess includes a second base plate gasket recess footprint that substantially matches the second base plate gasket footprint.

14. The hinge subassembly of claim 8 wherein the second cover plate gasket includes a second cover plate gasket footprint, and the second cover plate gasket recess includes a second cover plate gasket recess footprint that substantially matches the second cover plate gasket footprint.

15. The hinge subassembly of claim 8 wherein the second base plate gasket is secured within the second base plate gasket recess using adhesive and/or pressure fit.

16. The hinge subassembly of claim 8 wherein the second cover plate gasket is secured within the second cover plate gasket recess using adhesive and/or pressure fit.

17. The hinge subassembly of claim 1 wherein when the first base plate is configured with the first base plate gasket to form a first base plate gasket combination and the first cover plate is configured with the first cover plate gasket to form a first cover plate gasket combination and the first base plate gasket combination and the first cover plate gasket combination are placed into an opposing relationship with one another, the at least one first peripheral sidewall extends from the first base plate gasket second surface to the first cover plate gasket second surface, and/or at least one second peripheral sidewall extends from the first cover plate gasket second surface to the first base plate gasket second surface.

* * * * *